US008660135B2

(12) United States Patent
Antila (10) Patent No.: US 8,660,135 B2
(45) Date of Patent: Feb. 25, 2014

(54) METHOD AND APPARATUS FOR DETERMINING IF A MOBILE TERMINAL IS THE INTENDED RECIPIENT FOR INFORMATION PROVIDED VIA A CONTROL CHANNEL

(75) Inventor: Jussi Heikki Antila, Turku (FI)

(73) Assignee: Broadcom Corporation, Irvine, CA (US)

( * ) Notice: Subject to any disclaimer, the term of this patent is extended or adjusted under 35 U.S.C. 154(b) by 78 days.

(21) Appl. No.: 13/031,732

(22) Filed: Feb. 22, 2011

(65) Prior Publication Data

US 2012/0213090 A1 Aug. 23, 2012

(51) Int. Cl.
*H04L 12/40* (2006.01)
*H04B 1/00* (2006.01)

(52) U.S. Cl.
USPC ........... 370/438; 370/439; 370/478; 370/479; 370/480; 375/133; 375/134; 375/135; 375/136; 375/137

(58) Field of Classification Search
USPC ......... 370/236, 242, 251, 324, 330, 328, 335, 370/342, 438, 439, 478–480, 496, 524; 375/133–137
See application file for complete search history.

(56) References Cited

U.S. PATENT DOCUMENTS

2010/0195614 A1* 8/2010 Nimbalker et al. ........... 370/330
2011/0116428 A1* 5/2011 Seong et al. .................. 370/311
2012/0213090 A1* 8/2012 Antila ........................... 370/242

OTHER PUBLICATIONS

3rd Generation Partnership Project; Technical Specification Group Radio Access Network; Evolved Universal Terrestrial Radio Access (E-UTRA); Multiplexing and Channel Coding (Release 8), 3GPP TS 36.212 V8.1.0 (Nov. 2007), 39 pages.
3rd Generation Partnership Project; Technical Specification Group Radio Access Network; Evolved Universal Terrestrial Radio Access (E-UTRA); Physical Layer Procedures (Release 10), 3GPP TS 36.213 V10.1.0 (Mar. 2011) pp. 84-89.

* cited by examiner

Primary Examiner — Benjamin H Elliot, IV
(74) Attorney, Agent, or Firm — Alston & Bird LLP (57) ABSTRACT

A method, apparatus and computer program product are provided that may reduce the number of false accepts by reducing the instances in which a mobile terminal mistakenly determines that control channel information is intended for the mobile terminal. The method, apparatus and computer program product may determine whether control channel information appears to be directed to a respective mobile terminal, determine whether one or more filler bits have respective predefined values and thereafter identify the information to not be intended for the respective mobile terminal in an instance in which the filler bits fail to have the predefined values. In an instance in which the control channel information provides an uplink grant, the method, apparatus and computer program product may cause data to be transmitted via an uplink established per the uplink grant only if the filler bits have the predefined values.

20 Claims, 3 Drawing Sheets

METHOD AND APPARATUS FOR DETERMINING IF A MOBILE TERMINAL IS THE INTENDED RECIPIENT FOR INFORMATION PROVIDED VIA A CONTROL CHANNEL

TECHNOLOGICAL FIELD

Embodiments of the present invention relate generally to wireless communication technology and, more particularly, to a method, apparatus and computer program product for determining if a mobile terminal is the intended recipient for information provided via a control channel.

BACKGROUND

In mobile communications, a control channel may be utilized to inform mobile terminals regarding resource allocation, modulation, coding, hybrid automatic repeat request (HARQ) information, transmit power control (TPC) commands, etc. For example, a long-term evolution (LTE) network utilizes a physical downlink control channel (PDCCH) to communicate with and to provide such information to the mobile terminals. In an LTE network, the mobile terminals may utilize a blind detection technique to identify the PDCCH that is communicating with the respective mobile terminals. In this regard, blind detection may be utilized since multiple PDCCHs may be present in a single sub-frame and since a relatively large number of PDCCH transmission formats are supported.

The information provided via a control channel may include downlink control information (DCI). In addition, the information provided via the control channel may include a cyclic redundancy check (CRC) of the other information provided via the control channel. For example, a 16-bit CRC code may be included with the control channel information. An identifier, such as a radio network temporary identifier (RNTI), may be implicitly encoded in the CRC code and may therefore also be included with the control channel information.

In operation, the mobile terminals monitor the control channel and control channel information may be identified to be directed to a respective mobile terminal if the CRC is determined to be correct and the identifier, such as the RNTI, that is implicitly encoded in the CRC code matches an identifier associated with or otherwise monitored by the respective mobile terminal. In this regard, a mobile terminal generally monitors one or more identifiers, such as RNTIs, based upon the transmission mode of the mobile terminal.

Although an analysis of the CRC code, such as a 16-bit CRC code, is utilized to determine if the control channel information is directed to a respective mobile terminal, it is possible that some random bit sequences that are not, in fact, directed to the respective mobile terminal, may successfully pass the CRC check such that the associated control channel information will be incorrectly considered to be directed to the mobile terminal. This situation may result in a "false accept" in which the mobile terminal operates, at least for some period of time, under the mistaken determination that the control channel information was directed to the respective mobile terminal. For a 16 bit CRC code, the theoretical rate per sub-frame for false accepts is the product of $2^{-16}$, the number of decoding attempts and the number of identifiers, such as RNTIs, that are monitored by the respective mobile terminal. As such, each active mobile terminal may, in one example, experience a false accept once or twice per second by evaluating the control channel information in such a manner that the mobile terminal mistakenly determines that the control channel information is directed to the mobile terminal.

False accepts can degrade network performance. For example, a mobile terminal may falsely determine that control channel information that provides an uplink grant is directed to the respective mobile terminal. In this situation, the mobile terminal may transmit uplink data via an uplink identified by the uplink grant even though the uplink was actually intended to be granted to another mobile terminal. Since the network generally will not accept the uplink data erroneously transmitted by the mobile terminal in this situation, the mobile terminal may sometimes re-transmit the uplink data prior to the HARQ functionality restoring the state of the mobile terminal and avoiding any further erroneous transmissions via the uplink. However, the transmission of uplink data by the mobile terminal prior to the restoration of the state of the mobile terminal may cause at least some network performance loss, such as by unnecessarily increasing the signaling load on the network and/or potentially interfering with data transmitted by another mobile terminal via the same uplink. Additionally, the mobile terminal may also miss or fail to detect other control channel information that is actually intended for the respective mobile terminal while the mobile terminal falsely accepts and mistakingly acts upon control channel information that is intended for another mobile terminal.

BRIEF SUMMARY OF SOME EXAMPLE EMBODIMENTS

A method, apparatus and computer program product are therefore provided in accordance with an example embodiment that may reduce the number of false accepts or, in other words, reduce the number of instances in which a mobile terminal mistakenly determines that control channel information is intended for the mobile terminal when, in fact, the control channel information is not intended for the respective mobile terminal. As such, the method, apparatus and computer program product of one embodiment may reduce the instances in which a mobile terminal responds to an uplink grant premised upon falsely accepted control channel information and attempts to transmit uplink data in such a manner that unnecessarily consumes network resources and potentially conflicts with the use of the uplink by other mobile terminals. As such, the method, apparatus and computer program product of one example embodiment may correspondingly improve network performance, while reducing instances in which a mobile terminal misses control channel information that is intended for the respective mobile terminal as a result of the mobile terminal acting upon other falsely accepted control channel information.

In one example embodiment, a method is provided that determines whether information provided via a control channel appears to be directed to a respective mobile terminal, determines, with processing circuitry, whether one or more filler bits have respective predefined values and thereafter identifies the information to not be intended for the respective mobile terminal in an instance in which the one or more filler bits fail to have the respective predefined values. The method of one embodiment may also cause data to be transmitted via an uplink established as a result of an uplink grant included in the information provided via the control channel in an instance in which the one or more filler bits are determined to have the respective predefined values.

The information provided via the control channel may include downlink control information (DCI). As such, the method may also include receiving the DCI prior to its evaluation. The information provided via the control channel may also include the one or more filler bits. The determination of whether the one or more filler bits have the respective predefined values may include, in one embodiment, determining whether the one or more filler bits are zero. In this embodiment, the identification that the information is not intended for the respective mobile terminal may include identifying the information to not be intended for the respective mobile terminal in an instance in which any one of the filler bits is non-zero.

The method of one embodiment may also receive a cyclic redundancy check (CRC) of the information. In this embodiment, determining whether the information appears to be directed to the respective mobile terminal may include determining whether the CRC is valid. Further, determining whether the information appears to be directed to the respective mobile terminal may also include, in one embodiment, determining whether an identifier encoded in the CRC matches an identifier monitored by the respective mobile terminal.

In other embodiment, an apparatus is provided that includes processing circuitry configured at least to determine whether information provided via a control channel appears to be directed to a respective mobile terminal, determine whether one or more filler bits have respective predefined values and thereafter identify the information to not be intended for the respective mobile terminal in an instance in which the one or more filler bits fail to have the respective predefined values. The processing circuitry of one embodiment may also be configured to cause data to be transmitted via an uplink established as a result of an uplink grant included in the information provided via the control channel in an instance in which the one or more filler bits are determined to have the respective predefined values.

The information provided via the control channel may include downlink control information (DCI). As such, the processing circuitry may also be configured to receive the DCI prior to its evaluation. The information provided via the control channel may also include the one or more filler bits. As such, the processing circuitry may be configured to determine whether the one or more filler bits have the respective predefined values by determining, in one embodiment, whether the one or more filler bits are zero. In this embodiment, the processing circuitry may be further configured to identify that the information is not intended for the respective mobile terminal by identifying the information to be intended for a different recipient in an instance in which any one of the filler bits is non-zero.

The processing circuitry of one embodiment may also be configured to receive a cyclic redundancy check (CRC) of the information. In this embodiment, the processing circuitry may be configured to determine whether the information appears to be directed to the respective mobile terminal by determining whether the CRC is valid. Further, the processing circuitry may be configured to determine whether the information appears to be directed to the respective mobile terminal by determining, in one embodiment, whether an identifier encoded in the CRC matches an identifier monitored by the respective mobile terminal.

In a further embodiment, a computer program product is provided that includes at least one computer-readable storage medium having computer-executable program code instructions stored therein. The computer-executable program code instructions may include program code instructions for determining whether information provided via a control channel appears to be directed to a respective mobile terminal, determining whether one or more filler bits have respective predefined values and thereafter identifying the information to not be intended for the respective mobile terminal in an instance in which the one or more filler bits fail to have the respective predefined values.

The information provided via the control channel may include downlink control information (DCI). As such, the computer program product may also include program code instructions for receiving the DCI prior to its evaluation. The information provided via the control channel may also include the one or more filler bits. As such, the program code instructions for determining whether the one or more filler bits have the respective predefined values may include, in one embodiment, program code instructions for determining whether the one or more filler bits are zero. In this embodiment, the program code instructions for identifying that the information is not intended for the respective mobile terminal may include program code instructions for identifying the information to not be intended for the respective mobile terminal in an instance in which any one of the filler bits is non-zero.

The computer program product of one embodiment may also include program code instructions for receiving a cyclic redundancy check (CRC) of the information. In this embodiment, the program code instructions for determining whether the information appears to be directed to the respective mobile terminal may include program code instructions for determining whether the CRC is valid. Further, the program code instructions for determining whether the information appears to be directed to the respective mobile terminal may also include, in one embodiment, program code instructions for determining whether an identifier encoded in the CRC matches an identifier monitored by the respective mobile terminal.

In yet another embodiment, an apparatus is provided that includes means for determining whether information provided via a control channel appears to be directed to a respective mobile terminal, means for determining whether one or more filler bits have respective predefined values and means for thereafter identifying the information to not be intended for the respective mobile terminal in an instance in which the one or more filler bits fail to have the respective predefined values. The apparatus of one embodiment may also include means for causing data to be transmitted via an uplink established as a result of an uplink grant included in the information provided via the control channel in an instance in which the one or more filler bits are determined to have the respective predefined values.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

A method, apparatus and computer program product of an example embodiment of the present invention may be configured to reduce the number of false accepts by further evaluating the information provided by a network via a control channel in order to determine the instances in which the control channel information is directed to a respective mobile terminal with greater certainty. By avoiding at least some of the false accepts, the method, apparatus and computer program product of example embodiments may improve the overall network performance by avoiding unnecessary network signaling in conjunction with false accepts. Additionally, the method, apparatus and computer program product of an example embodiment of the present invention may reduce the number of instances in which a mobile terminal misses control channel information that is actually directed to the respective mobile terminal while operating on information that eventually proves to be the product of a false accept.

Figure 1:
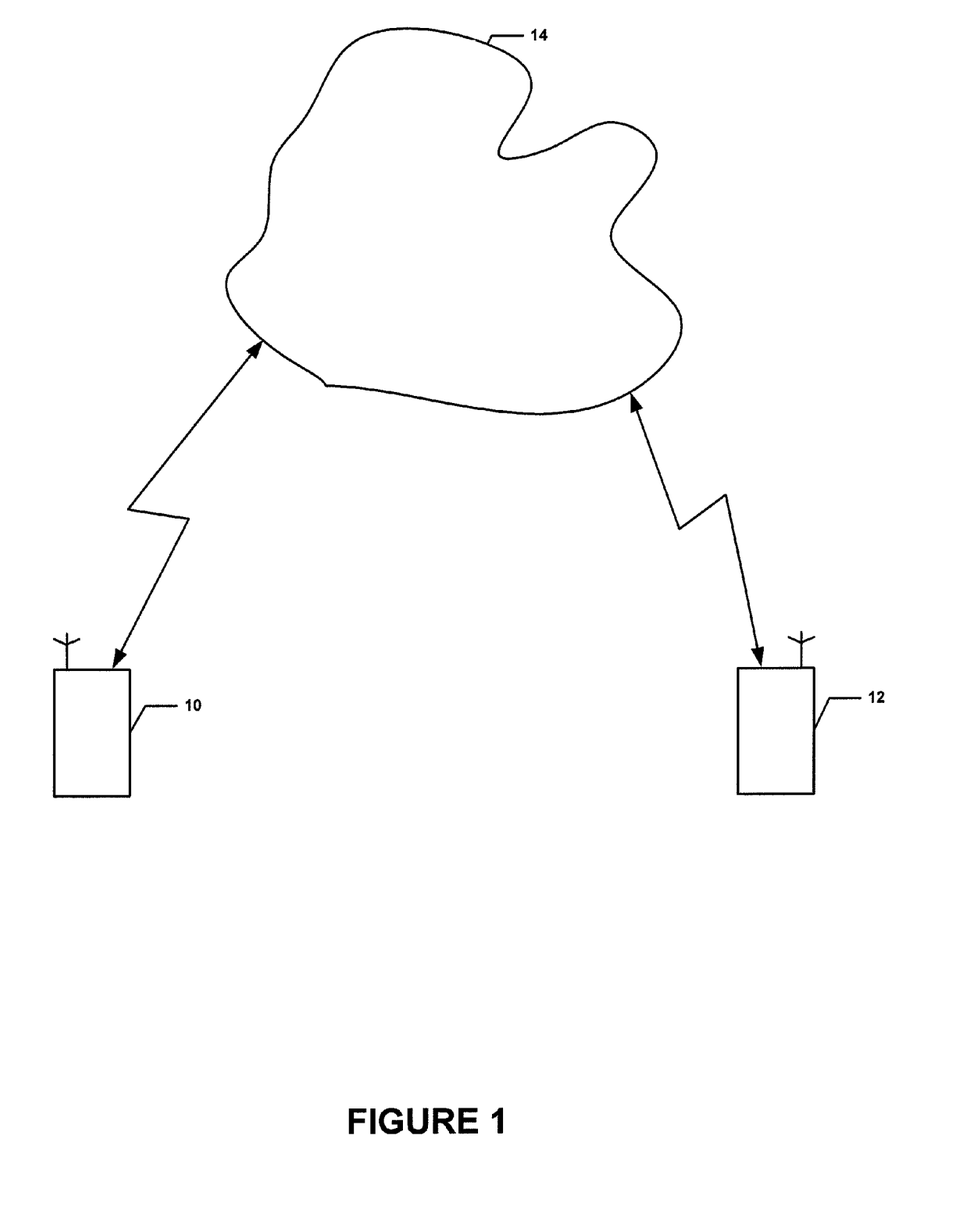
FIG. 1 illustrates one example of a communication system according to an example embodiment of the present invention.

One system that may provide for information to be transmitted from a network via a control channel to a plurality of mobile terminals and in which a method, apparatus and computer program product of an example embodiment of the present invention may be implemented as shown in FIG. 1. While a system that provides control channel information that is to be blindly decoded by a plurality of mobile terminals may be configured in various different manners, FIG. 1 illustrates a generic system diagram in which a device such as a mobile terminal 10 is shown in an example communication environment in which embodiments of the present invention may be employed. As shown in FIG. 1, an embodiment of a system in accordance with an example embodiment of the present invention may include a first communication device (e.g., mobile terminal 10) and a second communication device 12 that may each be capable of communication with a network 14 (e.g., a core network). The second communication device is provided as an example to illustrate potential multiplicity with respect to instances of other devices that may be included in the network and that may practice example embodiments. While the network may be configured in accordance with LTE, the network may employ other mobile access mechanisms such as LTE-Advanced (LTE-A), wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network. One or more communication terminals such as the mobile terminal 10 and the second communication device 12 may be in communication with each other or other devices via the network. In some cases, each of the communication terminals may include an antenna or antennas for transmitting signals to and for receiving signals from a base station or other communication node (e.g., evolved node B (eNB), node B or other base station or access point). The base station or other communication node could be, for example, part of one or more cellular or mobile networks or public land mobile networks (PLMNs). In turn, other devices such as processing devices (e.g., personal computers, server computers or the like) may be coupled to the mobile terminal and/or the second communication device via the network.

In some example embodiments, the mobile terminal 10 (and/or the second communication device 12) may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal may also include communication circuitry and corresponding hardware/software to enable communication with other devices and/or the network 14.

Figure 2:
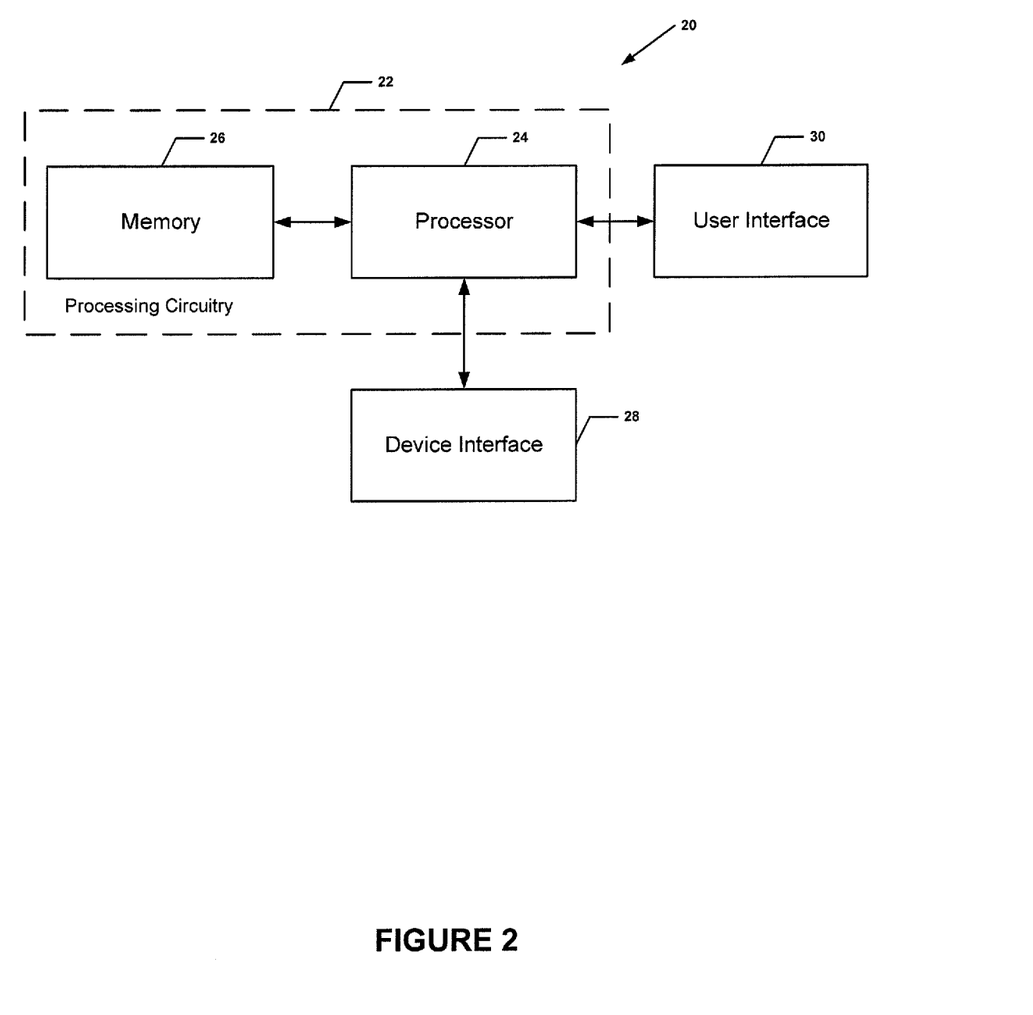
FIG. 2 illustrates a block diagram of an apparatus for evaluating information provided via a control channel in accordance with an example embodiment of the present invention.

In one embodiment, for example, the mobile terminal 10 may be embodied as or otherwise include an apparatus 20 as generically represented by the block diagram of FIG. 2. In this regard, the apparatus may be configured to evaluate information provided via a control channel and to determine which of the control channel information is directed to the respective mobile terminal. While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface in the context of a mobile terminal 10 may include, for example, a keyboard, a mouse, a joystick, a display, a touch screen, a microphone, a speaker, and/or other input/output mechanisms.

The device interface 28 may include one or more interface mechanisms for enabling communication with other devices and/or networks. In some cases, the device interface may be any means such as a device or circuitry embodied in either hardware, or a combination of hardware and software that is configured to receive and/or transmit data from/to a network 14 and/or any other device or module in communication with the processing circuitry 22. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Figure 3:
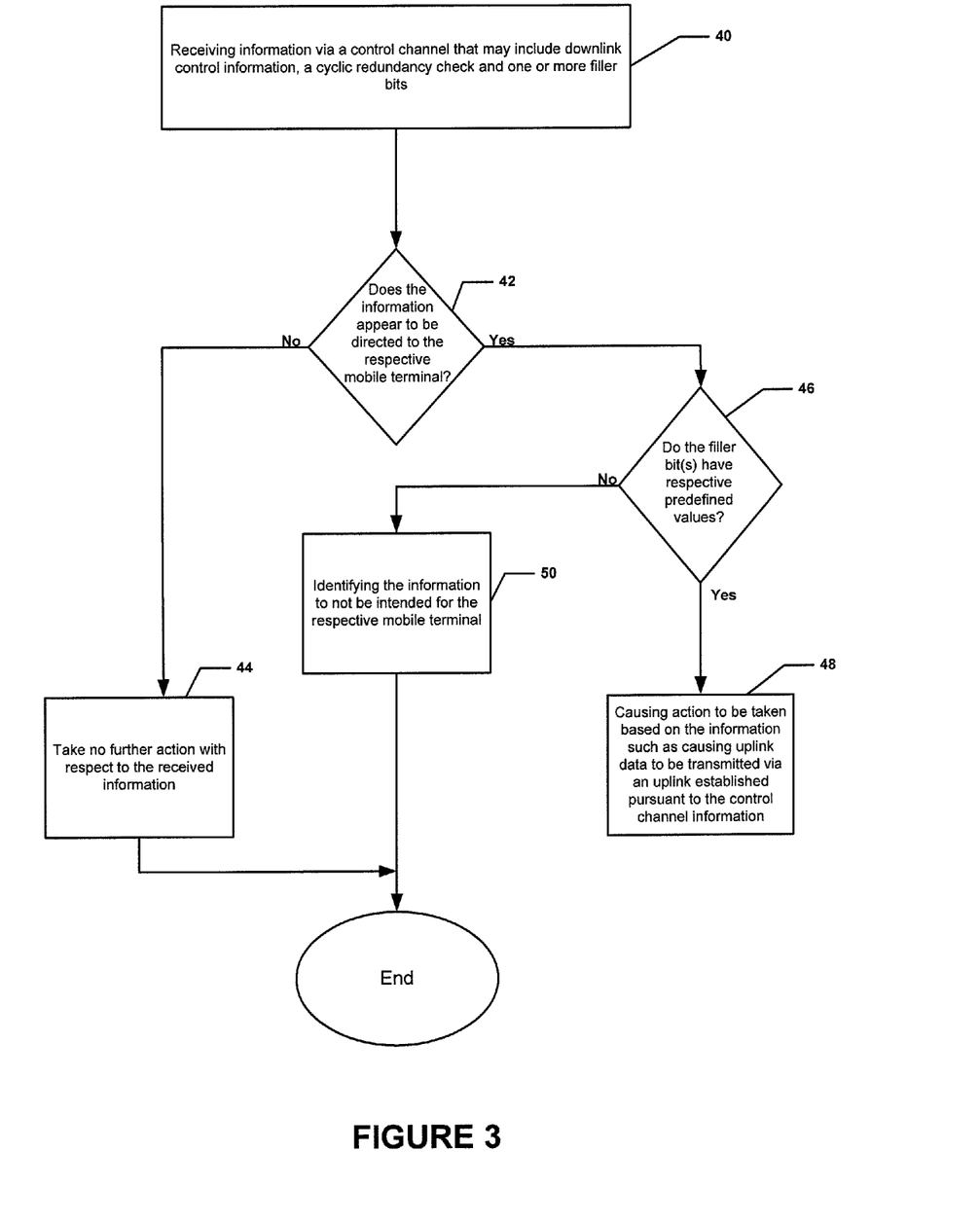
FIG. 3 illustrates a flow chart of operations performed during an evaluation of the information provided via a control channel in accordance with an example embodiment of the present invention.

Referring now to FIG. 3, a flowchart illustrating the operations performed by a method, apparatus and computer program product, such as apparatus 20 of FIG. 2, in accordance with one embodiment of the present invention are illustrated. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

With reference to block 40 of FIG. 3, the apparatus 20 may include means, such as the processing circuitry 22, the processor 24, the device interface 26 or the like, for receiving information via a control channel. In this regard, the apparatus may be embodied by or may operate in association with a mobile terminal 10 so as to receive information via a control channel from the network 14. In one embodiment, the information that is provided via the control channel is received by each of a plurality of mobile terminals, such as mobile terminal 10 and second communication device 12 of FIG. 1, such that the mobile terminals and/or other communication devices must evaluate the control channel information to determine if it is the intended recipient of the control channel information.

While different types of information may be provided via the control channel, the information provided via the control channel of an LTE system may include downlink control information (DCI). In this regard, an LTE system may define various formats of the control message including the DCI depending upon the purpose of the control message. For example, DCI format 1 may be used for the assignment of a downlink shared channel resource in an instance in which no spatial multiplexing is utilized. DCI formats 2 and 2A may provide downlink shared channel assignments in the case of closed loop or open loop spatial multiplexing, respectively. DCI format 0 may be utilized to convey uplink scheduling grants and DCI formats 3 and 3A may be utilized to convey transmit power control (TPC) commands for an uplink. In an LTE system, the control channel via which the control messages containing the DCI are provided may be the PDCCH. As such, an example embodiment of the method, apparatus and computer program product will now be described in conjunction with DCI provided via the PDCCH in an LTE system. However, the method, apparatus and computer program product of other embodiments may be employed in other types of systems with different control channels and/or different control channel information.

In addition to the DCI, the information provided via the control channel, such as a PDCCH, may also include a cyclic redundancy check (CRC) of other information provided via the control channel, such as a CRC of the DCI. Thus, the apparatus 20 may also include means, such as the processing circuitry 22, the processor 24, the device interface 28 or the like, for receiving a CRC of the other information provided via the control channel. While the CRC may have various sizes, the CRC of one embodiment is a 16-bit CRC code of the DCI provided via the PDCCH. Additionally, an identifier may be encoded, such as implicitly encoded, in the CRC. As such, the apparatus may similarly include means, such as the processing circuitry, the processor, the device interface or the like, for receiving an identifier in association with the information provided via the control channel. The identifier may be encoded in the CRC in various manners. In one example, the CRC may be scrambled with the identifier so as to encode the identifier within the CRC that is received by the mobile terminal 10. While various identifiers may be utilized, the identifier may be of a type that is monitored by the mobile terminal that receives the information via the control channel. For example, the identifier of one embodiment may be an RNTI. In this regard, a mobile terminal may monitor one or more RNTIs based on the transmission mode of the mobile terminal.

The information that is received via the control channel may also include one or more filler bits that are utilized to pad the information provided via the control channel to have a predetermined size or length. In accordance with an example embodiment of the present invention, the filler bits may have respective predefined values. For example, each of the filler bits that are provided by the network 14 in accordance with one embodiment of the present invention may be zero.

As shown in block 42 of FIG. 3, the apparatus 20 may also include means, such as the processing circuitry 22, the processor 24 or the like, for determining whether the information provided via the control channel appears to be directed to the respective mobile terminal 10. In an embodiment in which the information provided via the control channel includes a CRC code, the determination as to whether the information provided via the control channel appears to be directed to the respective mobile terminal may include determining whether the CRC is valid based upon the other information, such as the DCI, provided via the control channel. Additionally, the determination as to whether the information provided via the control channel appears to be directed to the respective mobile terminal may include determining whether an identifier, such as an RNTI, encoded in the CRC matches an identifier monitored by the respective mobile terminal. In this embodiment, in an instance in which the CRC is valid and the encoded identifier matches an identifier monitored by the respective mobile terminal, a determination may be made that the information provided via the control channel appears to be directed to the respective mobile terminal. Conversely, if a determination is made that the CRC is invalid or that the encoded identifier fails to match an identifier monitored by the respective mobile terminal, a determination may be made that the information provided via the control channel is not directed to the respective mobile terminal in which case, no further action need be taken by the mobile terminal with respect to the control channel information as shown in block 44.

In an instance in which the apparatus 20 determines that the information provided via the control channel appears to be directed to the respective mobile terminal 10, the apparatus 20 may include means, such as the processing circuitry 22, the processor 24 or the like, for determining whether the one or more filler bits that are included with the information provided via the control channel have the respective predefined values. See block 46 of FIG. 3. As indicated above, the filler bits may have various predefined values, such as zero in one embodiment.

In an instance in which the filler bits are determined to have the respective predefined values, the apparatus 20 may continue in accordance with a determination that the information provided via the control channel is directed to the respective mobile terminal. In this regard, the apparatus may include means, such as the processing circuitry 22, the processor 20 or the like, for causing action to be taken based upon the information provided by the control channel. See block 48. For example, the information provided by the control channel may provide an uplink grant identifying an uplink from the mobile terminal 10 to the network 14. In this instance, the apparatus may then cause data to be transmitted via the uplink in an instance in which the one or more filler bits are determined to have the respective predefined values. However, the operations performed by the apparatus following the determination that the filler bits have the respective predefined values and based upon the determination that the information provided by the control channel is directed to the respective mobile terminal may vary depending upon the information provided via the control channel such that the establishment of an uplink and the transmission of uplink data via the established uplink is only provided by way of an example.

In contrast, in an instance in which the apparatus 20 determines that the one or more filler bits failed to have the respective predefined value, such as in an instance in which one or more of the filler bits has a value of 1 even though the respective predefined values of the filler bits were to be zero, the apparatus may include means, such as the processing circuitry 22, the processor 24 or the like, for identifying the information to not be intended for the respective mobile terminal, such as by determining that the information is not intended for the respective mobile terminal. See operation 50. In this instance, the initial determination of the apparatus that the information provided via the control channel is directed to the respective mobile terminal 10, such as a result of having determined that the CRC is valid and that an encoded identifier matches an identifier monitored by the respective mobile terminal, may be overcome or disproved by the determination that the one or more filler bits failed to have the respective predefined values. Once the information is identified to not have been intended for the respective mobile terminal, the apparatus generally does not take any further action based upon the information provided by via the control channel. For example, in an instance in which the information provided by via the control channel provides an uplink grant, the apparatus will not cause uplink data to be transmitted via the uplink since the determination that one or more filler bits have values different than the respective predefined values indicates that the information is not actually intended for the respective mobile terminal.

In this regard, the evaluation of the filler bits and the determination as to whether or not the filler bits have the respective predefined values provide an additional level of certainty with respect to any determination as to whether the information provided via the control channel is directed to the respective mobile terminal 10. Indeed, in an instance in which the filler bits fail to have the respective predefined values, the apparatus 20 may identify the information to not have been intended for the respective mobile terminal. Instead, the information may have been intended for a different recipient, such as another mobile terminal, since the differently valued filler bits may have been intentionally provided by the network 14 to indicate that the information is intended for a different recipient. Alternatively, the differently valued filler bits may indicate that the information has been altered during the transmission from the network to the mobile terminal or to otherwise just be the product of noise in such a way that the validity of the CRC and the matching of the encoded identifier within an identifier monitored by the respective mobile terminal are all subject to having been similarly altered during the transmission from the network to the mobile terminal in such a way that the initial determination that the information provided via the control channel is directed to the respective mobile terminal may no longer be trustworthy. As such, while the information that was initially (and erroneously) determined to have been control channel information intended for the respective mobile terminal may, in some instance, actually be intended for another mobile terminal, the information, in other instances, may prove not to be control channel information at all, but to be the product of noise so as not to have any intended recipient. Still further, the control channel information that was initially (and erroneously) determined to have been directed for the respective mobile terminal may prove to be only a portion of a larger segment of control channel information that was intended to be directed to a different recipient, such as another mobile terminal. Indeed, control channel information may be transmitted in differently sized segments, such as one unit segments, two unit segments, four unit segments and eight unit segments. As such, by way of example, two unit control channel information that was initially (and erroneously) determined to have been directed for the respective mobile terminal may prove to be only a portion of a four unit segment or an eight unit segment of control channel information that is intended for another mobile terminal. By filtering out at least some of the false accepts by a review of the filler bits, the method, apparatus and computer program product of example embodiments of the present invention may reduce the number of false accepts and correspondingly improve network performance and the responsiveness of mobile terminal to information provided via the control channel that is actually intended for the respective mobile terminal.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining whether information provided via a control channel is a candidate to be directed to a respective mobile terminal;
   determining, with processing circuitry, whether one or more filler bits have respective predefined values, wherein the information provided by the control channel includes the one or more filler bits in conjunction with downlink control information (DCI); and
   thereafter identifying information previously and erroneously determined as intended to be directed to the respective terminal as information not to be directed to the respective mobile terminal in an instance in which the one or more filler bits fail to have the respective predefined values.

2. A method according to claim 1 wherein the information provided via the control channel includes the one or more filler bits.

3. A method according to claim 1 wherein determining whether one or more filler bits have respective predefined values comprise determining whether the one or more filler bits are zero, and wherein identifying the information to not be directed to the respective mobile terminal comprises identifying the information to not be directed to the respective mobile terminal in an instance in which any one of the filler bits is non-zero.

4. A method according to claim 1 further comprising receiving the information as downlink control information (DCI).

5. A method according to claim 1 further comprising receiving a cyclic redundancy check (CRC) of the information, and wherein determining whether the information appears to be directed to the respective mobile terminal comprises determining whether the CRC is valid.

6. A method according to claim 5 wherein determining whether the information appears to be directed to the respective mobile terminal further comprises determining whether an identifier encoded in the CRC matches an identifier monitored by the respective mobile terminal.

7. A method according to claim 1 further comprising causing data to be transmitted via an uplink established as a result of an uplink grant included in the information provided via the control channel in an instance in which the one or more filler bits are determined to have the respective predefined values.

8. An apparatus comprising processing circuitry configured at least to:
   determine whether information provided via a control channel is a candidate to be directed to a respective mobile terminal;
   determine whether one or more filler bits have respective predefined values, wherein the information provided by the control channel includes the one or more filler bits in conjunction with downlink control information (DCI); and
   thereafter identify information previously and erroneously determined as intended to be directed to the respective terminal as information not to be intended for the respective mobile terminal in an instance in which the one or more filler bits fail to have the respective predefined values.

9. An apparatus according to claim 8 wherein the information provided via the control channel includes the one or more filler bits.

10. An apparatus according to claim 8 wherein the processing circuitry being configured to determine whether one or more filler bits have respective predefined values comprises being configured to determine whether the one or more filler bits are zero, and wherein the processing circuitry being configured to identify the information to not be intended for the respective mobile terminal comprises being configured to identify the information to not be intended for the respective mobile terminal in an instance in which any one of the filler bits is non-zero.

11. An apparatus according to claim 8 wherein the processing circuitry is further configured to receive the information as downlink control information (DCI).

12. An apparatus according to claim 8 wherein the processing circuitry is further configured to receive a cyclic redundancy check (CRC) of the information, and wherein the processing circuitry being configured to determine whether the information appears to be directed to the respective mobile terminal comprises being configured to determine whether the CRC is valid.

13. An apparatus according to claim 12 wherein the processing circuitry being configured to determine whether the information appears to be directed to the respective mobile terminal comprises being configured to determine whether an identifier encoded in the CRC matches an identifier monitored by the respective mobile terminal.

14. An apparatus according to claim 8 wherein the processing circuitry is further configured to cause data to be transmitted via an uplink established as a result of an uplink grant included in the information provided via the control channel in an instance in which the one or more filler bits are determined to have the respective predefined values.

15. A computer program product comprising at least one non-transitory computer-readable storage medium having computer-executable program code instructions stored therein, the computer-executable program code instructions comprising program code instructions for:

determining whether information provided via a control channel is a candidate to be directed to a respective mobile terminal;

determining whether one or more filler bits have respective predefined values, wherein the information provided by the control channel includes the one or more filler bits in conjunction with downlink control information (DCI); and thereafter identifying information previously and erroneously determined as intended to be directed to the respective terminal as information not to be intended for the respective mobile terminal in an instance in which the one or more filler bits fail to have the respective predefined values.

16. A computer program product according to claim 15 wherein the information provided via the control channel includes the one or more filler bits.

17. A computer program product according to claim 15 wherein the program code instructions for determining whether one or more filler bits have respective predefined values comprise program code instructions for determining whether the one or more filler bits are zero, and wherein the program code instructions for identifying the information to not be intended for the respective mobile terminal comprise program code instructions for identifying the information to not be intended for the respective mobile terminal in an instance in which any one of the filler bits is non-zero.

18. A computer program product according to claim 15 further comprising program code instructions for receiving the information as downlink control information (DCI).

19. A computer program product according to claim 15 further comprising program code instructions for receiving a cyclic redundancy check (CRC) of the information, and wherein the program code instructions for determining whether the information appears to be directed to the respective mobile terminal comprise program code instructions for determining whether the CRC is valid.

20. A computer program product according to claim 19 wherein the program code instructions for determining whether the information appears to be directed to the respective mobile terminal comprises further comprise program code instructions for determining whether an identifier encoded in the CRC matches an identifier monitored by the respective mobile terminal.

* * * * *